(12) United States Patent
Massey et al.

(10) Patent No.: US 8,529,973 B2
(45) Date of Patent: Sep. 10, 2013

(54) COFFEE COMPOSITION AND METHOD OF MAKING A THREE-LAYERED COFFEE DRINK

(75) Inventors: Ayse Tulay Massey, Banbury (GB); Adrian Harold Massey, Banbury (GB)

(73) Assignee: Kraft Foods R&D, Inc., Northfield, IL (US)

( * ) Notice: Subject to any disclaimer, the term of this patent is extended or adjusted under 35 U.S.C. 154(b) by 0 days.

(21) Appl. No.: 12/679,237

(22) PCT Filed: Sep. 22, 2008

(86) PCT No.: PCT/GB2008/003220
§ 371 (c)(1),
(2), (4) Date: Jul. 19, 2010

(87) PCT Pub. No.: WO2009/037494
PCT Pub. Date: Mar. 26, 2009

(65) Prior Publication Data
US 2010/0310727 A1 Dec. 9, 2010

(30) Foreign Application Priority Data
Sep. 20, 2007 (GB) .................................. 0718364.3

(51) Int. Cl.
A23L 1/00 (2006.01)

(52) U.S. Cl.
USPC ............. 426/89; 426/594; 426/564; 426/569; 426/567; 426/590; 426/561

(58) Field of Classification Search
USPC ................. 426/594, 564, 569, 567, 590, 561, 426/89
See application file for complete search history.

(56) References Cited

U.S. PATENT DOCUMENTS

| 4,378,380 A * | 3/1983 | Scarpellino et al. .......... 426/533 |
| 4,438,147 A | 3/1984 | Hedrick, Jr. |
| 4,530,850 A | 7/1985 | Trop |
| 4,746,527 A | 5/1988 | Kuypers |
| 4,830,869 A | 5/1989 | Wimmers et al. |
| 5,145,697 A | 9/1992 | Cajigas |
| 5,196,220 A | 3/1993 | Clare et al. |
| 5,366,751 A | 11/1994 | Pordy |
| 5,480,670 A * | 1/1996 | Pordy ........................... 426/580 |
| 5,721,003 A * | 2/1998 | Zeller ........................... 426/570 |
| 5,780,092 A | 7/1998 | Agbo et al. |
| 6,048,567 A | 4/2000 | Villagran et al. |
| 6,071,547 A | 6/2000 | Schechter |
| 6,129,943 A | 10/2000 | Zeller et al. |
| 6,168,819 B1 | 1/2001 | Zeller et al. |
| 6,174,557 B1 | 1/2001 | Gamez-Rumpf et al. |
| 6,180,159 B1 | 1/2001 | Villagran et al. |
| 6,207,203 B1 * | 3/2001 | Atkinson et al. ................ 426/73 |
| 6,217,931 B1 | 4/2001 | Meister |
| 6,277,429 B1 | 8/2001 | Zeller et al. |
| 6,290,997 B1 | 9/2001 | Villagran et al. |
| 6,586,034 B2 | 7/2003 | Meister et al. |
| 6,737,098 B1 * | 5/2004 | Devine et al. ................. 426/576 |
| 6,799,613 B2 | 10/2004 | Lichi |
| 6,838,100 B2 | 1/2005 | Jaeger et al. |
| 6,838,110 B2 | 1/2005 | Wragg et al. |
| 7,013,933 B2 | 3/2006 | Sher et al. |
| 7,018,668 B2 | 3/2006 | Villagran et al. |
| 7,445,804 B2 * | 11/2008 | Lloyd et al. ..................... 426/93 |
| 2002/0197355 A1 | 12/2002 | Klein et al. |
| 2004/0076730 A1 * | 4/2004 | Wilkinson .................... 426/590 |
| 2005/0118306 A1 | 6/2005 | Ludwig et al. |
| 2005/0153030 A1 | 7/2005 | Young et al. |
| 2005/0244544 A1 | 11/2005 | Lloyd et al. |
| 2006/0040023 A1 | 2/2006 | Zeller et al. |
| 2006/0040038 A1 | 2/2006 | Zeller et al. |

FOREIGN PATENT DOCUMENTS

| EP | 0 403 825 A2 | 12/1990 |
| EP | 0458310 A1 | 11/1991 |
| EP | 0 875 150 A1 | 11/1998 |
| EP | 1541042 A1 | 6/2005 |
| EP | 1588625 A1 | 10/2005 |
| EP | 1639899 A1 | 3/2006 |
| JP | 3266939 A | 11/1991 |
| JP | 11009256 A | 1/1999 |
| JP | 2000-014319 | * 1/2000 |
| JP | EP 1159906 | * 12/2001 |
| JP | 2002191301 A | 7/2002 |
| WO | 93/08704 A1 | 5/1993 |
| WO | 02/00031 A2 | 1/2002 |
| WO | 2005/063058 A1 | 7/2005 |
| WO | 2005/094600 A1 | 10/2005 |

OTHER PUBLICATIONS

English translation of JP 2000-014319, published Jan. 2000, from http://www4.ipdl.inpit.go.jp.*
Quest Coffee. 2013. https://www.facebook.com/QuestCoffee.*
International Preliminary Report on Patentability, International Application No. PCT/GB2008/003220, date of issuance Mar. 24, 2010, 7 pages.
British Search Report, British Application No. GB0718364.3, date of search Dec. 5, 2007, 1 page.

* cited by examiner

Primary Examiner — Anthony Weier
(74) Attorney, Agent, or Firm — Fitch, Even, Tabin & Flannery LLP

(57) ABSTRACT

The disclosure relates to a coffee composition, in particular, an instant coffee composition which can provide a three-layered coffee drink in one step. The coffee composition having coffee, a foaming agent, a protein source and at least 1.3 wt % (based on the total weight of the composition) of a kappa-carrageenan, iota-carrageenan or mixture thereof. The disclosure also relates to a method for the preparation of such a composition and such a drink.

19 Claims, No Drawings

COFFEE COMPOSITION AND METHOD OF MAKING A THREE-LAYERED COFFEE DRINK

The disclosure herein relates to a coffee composition, in particular, an instant coffee composition which can provide a three-layered coffee drink in one step. It also relates to a method for the preparation of such a composition and such a drink.

BACKGROUND

Instant coffee compositions are well known. A coffee composition can be made into a coffee drink simply by the addition of hot water. For ease of use by a consumer, a coffee composition may include a creamer in order to provide a whitening effect. Both non-foaming and foaming creamers are known.

Known instant coffee compositions intended for use by a domestic consumer provide either a homogenous coffee drink or a two-layered drink. A composition comprising instant coffee and a foaming creamer will provide a two-layered drink consisting of a liquid layer of the main coffee drink and a foam layer. Three-layered coffee drinks are available in an "away from home" format prepared by trained staff. Such coffee drinks require considerable skill in pouring parts of the beverage without causing mixing of the layers. If it were possible to prepare such compositions conveniently at home, cooking appliances would be necessary, for example to prepare a milk foam separately.

Latte Macchiato type beverages with different layers can be prepared using specially designed dispensing units such as those described in U.S. Pat. No. 6,799,613 which regulate flow rate, or liquid concentrates with special dispensing machines as described in U.S. Pat. No. 7,013,933. In both cases the separation between the layers relies specifically on the difference in densities of the liquids to create two or more layers which are limited to the factors such as regulation of the flow rate and order at which the liquid components are introduced. Beverages obtained by either of these processes require more than one preparation step and may therefore be off-putting and too complicated for a consumer.

SUMMARY

There is provided herein an instant coffee composition in a convenient form for the preparation of three layered beverages which requires no skill or limited skill and no special cooking appliances, but rather a simple addition of water in a single, simple step.

There is provided a coffee composition comprising:
a) coffee;
b) a foaming agent;
c) a protein source; and
d) at least 1.3 wt %, based on the total weight of the composition, of a kappa-carrageenan, iota-carrageenan or mixture thereof.

There is also provided a method for preparing a composition as defined above which comprises mixing together the coffee, creamer and kappa-carrageenan, iota-carrageenan or mixture thereof.

There is additionally provided a method for preparing a three-layered instant coffee drink which comprises mixing hot water with a composition as defined above.

It has surprisingly been found that incorporation of particular carrageenans, namely kappa-carrageenan, iota-carrageenan or a mixture thereof, in a coffee composition comprising instant coffee and a foaming creamer will provide a three-layered drink on simple dilution with hot water, optionally, but preferably, with stirring. The drink contains a bottom liquid layer, a top froth layer and a middle weak gel layer. The middle layer has a density between the densities of the foam and bottom layers. This effect is not achieved with other carrageenans such as lambda-carrageenan or with other thickeners such as alginates, other gums such as xanthan gum, pectin or other functional ingredients such as microparticulated whey proteins. It is postulated, although we are not bound by this theory, that the middle gel layer is formed by the interaction of the kappa- or iota-carrageenan with the protein contained in dairy creamers, in particular caseins, and the mineral salts such as calcium and potassium salts associated with them.

DETAILED DESCRIPTION

The first component of the composition provided herein is a coffee. Instant and roast and ground coffees are well known to those skilled in the art. The composition preferably comprises an instant coffee, a roast and ground coffee or a mixture thereof in an amount of from 0.5 to 25 wt %, more preferably 5 to 20 wt %, more specifically 10 to 15 wt %, most preferably in an amount of about 12 wt %, based on the total weight of the composition.

The second component is a foaming agent. Again, such components are well known to those skilled in the art. A foaming agent may be a foam boosting agent containing encapsulated pressurised gas as described in EP-A-1627572 or US-A-2006-0040023. Other examples of foam boosting agents are described, for example, in U.S. Pat. No. 6,168,819, U.S. Pat. No. 5,780,092, in U.S. Pat. No. 6,048,567, U.S. Pat. No. 6,129,943 and U.S. Pat. No. 6,277,429. The foam boosting agent, preferably a carbohydrate foam boosting agent, containing encapsulated pressurised gas is preferably present in an amount of from 1-20 wt %; more preferably 5-15 wt %; and most preferably 13 wt %.

Foaming agent and coffee can be combined using a foaming soluble coffee as described in US 20020040038A1 (EP1627568A1) in an amount of 0.5 to 25 wt %, more preferably 5 to 20 wt %, more specifically 10 to 15 wt %, most preferably in an amount of about 12 wt %, based on the total weight of the composition.

The third component is a protein source. The protein source is preferably a creamer such as a dairy creamer or a non-dairy creamer and a milk protein such as casein.

The foaming agent and protein source may be two separate components, or may be combined, such as a foaming creamer as well known in the art. The protein source is preferably present in an amount of from 1 to 20 wt %, more preferably 5 to 15 wt % and most preferably about 12.5 wt % based on the total weight of the composition.

The fourth component of the composition provided herein is at least 1.3 wt %, based on the total weight of the composition, of a kappa-carrageenan, iota-carrageenan or mixture thereof. Preferably, the kappa-carrageenan, iota-carrageenan or mixture thereof is present in an amount of at least 2 wt %, more preferably at least 4 wt %, more preferably from 4 to 10 wt %, even more preferably from 5 to 7 wt % and most preferably about 6 wt %.

It is possible to include further components acting as a source of potassium or calcium ions, for example potassium or calcium salts such as calcium carbonate, potassium carbonate, calcium gluconate or potassium gluconate.

The composition provided herein may, if desired, comprise further components. For example, the composition may comprise further carrageenan fractions, other carbohydrates such as sucrose or lactose or a mixture thereof, flavourings, for example chocolate, cream, milk, caramel or coffee, and/or colourants, chocolate pieces or vitamins.

Compositions are further described in the following Examples.

EXAMPLES

Comparative Example 1

A conventional instant cappuccino reference mix was prepared by mixing together the following components:

| | |
|---|---|
| 1.78 g | Spray dried instant soluble coffee |
| 2.22 g | Sugar |
| 1.63 g | Lactose |
| 7.06 g | Foaming dairy creamer containing 25.0% fat and 12.6% casein. |
| 2.06 g | Carbohydrate foam boosting agent containing encapsulated pressurised gas. |
| 0.06 g | Spray dried cream flavour. |
| 14.80 g | Total |

The above composition was reconstituted with 150 ml hot (88° C. water) in a 400 ml beaker having an inner diameter of 65 mm. A creamy cappuccino was obtained with a 42 mm liquid layer and a 22 mm froth layer.

Example 2

The composition of Comparative Example 1 was prepared with the addition of 1 g of the commercial carrageenan Genulacta LP41, which consists of a mixture of kappa- and iota-carrageenans. This was added to the dry reference mixture prior to reconstitution. The composition was reconstituted to obtain a cappuccino drink in the same manner as in Comparative Example 1 with stirring for about 8 to 10 seconds until the powder had been completely dissolved.

Within 30 seconds of stirring a beverage with three distinct layers was formed. The bottom liquid layer had a height of 35 mm, the froth layer had a height of 22 mm and a middle layer of a weak gel was formed having a height of 10 mm. The middle layer was found to be darker than the froth layer and lighter than the liquid layer. On drinking the middle layer provided a more viscous and more lubricious mouth feel than the liquid layer. It was also found to be denser and more viscous than the froth layer. The overall beverage had a thick texture with a more lubricious and creamier mouth feel as compared to the beverage prepared in Comparative Example 1.

Example 3

The composition of Example 2 was prepared with the addition of 0.08 g of spray dried artificial coffee flavour. On reconstitution a three layered cappuccino beverage was obtained. On tasting, each beverage layer had a different intensity of coffee flavour with the liquid layer having the strongest flavour. The middle layer had a pleasant coffee flavour and the foam had very little coffee flavour.

Example 4

The composition of Example 2 was prepared with the addition of 0.05 g spray dried natural milk flavour. On reconstitution a cappuccino beverage with three layers was obtained. On tasting each beverage layer had a different intensity of milk flavour. The liquid layer had the strongest milky flavour, the middle layer had a weaker but pleasantly milky flavour and the foam had very slight milk flavour.

Example 5

The composition of Comparative Example 1 was prepared with the addition of 0.5 g ISP RCIC 550 iota-carrageenan. On reconstitution three distinct layers were formed; a 33 mm liquid layer, an 8 mm middle layer and an 18 mm foam layer.

Example 6

The composition of Example 2 was prepared except that the foaming dairy creamer was replaced with an equal weight of non-foaming non-dairy creamer comprising 4.5% casein. On reconstitution the beverage had three distinct layers, a dark bottom liquid layer, a 6 mm high small middle layer and a 17 mm high foam layer. The reduced casein in the mix resulted in a reduced height of the middle layer.

Comparative Example 7

The composition of Comparative Example 1 was prepared with the addition of 1 g of commercial lambda-carrageenan, Genuvisco CSM-2. On reconstitution a cappuccino beverage with a foam and a liquid layer was obtained. Although the resulting beverage was more viscous, no third layer was formed.

Comparative Example 8

The composition of Comparative Example 1 was prepared with the addition of 1 g of commercial microparticulated whey protein Simplesse 100. On reconstitution the beverage had only two distinct layers of a foam and a liquid.

Comparative Example 9

The composition of Example 2 was prepared except that the foaming dairy creamer was replaced with an equal weight of non-foaming, non-dairy creamer containing 4.5% sodium caseinate and the carbohydrate foam boosting agent containing encapsulated pressurized gas was totally excluded. On reconstitution the beverage had no foam and no middle layer. Although gelling had occurred, it did not form a layer due to the absence of the foam.

Example 10

The composition of Example 2 was prepared except that the carbohydrate foam boosting agent was replaced with 0.3 g of edible acid (e.g. citric acid) and 0.3 g of bi-carbonate of soda. On reconstitution the beverage had three distinct layers, a dark bottom liquid layer, a 10 mm high middle layer and a 40 mm high foam layer.

Example 11

The composition of Example 2 was prepared with the addition of 1 g of Roast and Ground coffee. On reconstitution the beverage had three distinct layers with dark bottom layer, 15 foam and 10 middle gel layer.

Example 12

The composition of example 2 was prepared except that spray dried instant soluble coffee was replaced with equal amounts of roast and ground coffee. On reconstitution the beverage had three distinct layers with dark bottom layer, 20 mm foam and 10 middle gel layer.

Comparative Example 13

The composition of Comparative Example 1 was prepared with the addition of 0.15 g of the commercial carrageenan Genulacta LP41, which consists of a mixture of kappa- and iota-carrageenans, prior to reconstitution. On reconstitution a cappuccino beverage with only two layers (foam and liquid) was obtained.

The invention claimed is:

1. A coffee composition comprising:
   a) 0.5 to 25 wt % coffee;
   b) 0.5 to 25 wt % foaming agent;
   c) 1 to 20 wt % protein source; and
   d) at least 2 wt %, based on the total weight of the composition, of a kappa-carrageenan, iota-carrageenan or combination thereof, wherein the amounts of the coffee, the foaming agent, the protein source, and the kappa-carrageenan, iota-carrageenan, or combination thereof are effective to provide a bottom liquid layer, a top froth layer, and a middle gel layer upon dilution of the coffee composition in water.

2. The composition according to claim 1, wherein the coffee comprises an instant coffee, a roast and ground coffee or a combination thereof.

3. The composition according to claim 1, wherein the kappa-carrageenan, iota-carrageenan or combination thereof is present in an amount of from 4 to 10 wt % with respect to the total weight of the composition.

4. The composition according to claim 3 wherein the kappa-carrageenan, iota-carrageenan or combination thereof is present in an amount of 5 to 7 wt % based on the total weight of the composition.

5. The composition according to claim 1, wherein the foaming agent comprises a dairy creamer.

6. The composition according to claim 1, wherein the protein source is (i) a dairy creamer or (ii) a non-dairy creamer and a milk protein.

7. The composition according to claim 1, wherein the composition further comprises a foam boosting agent.

8. The composition according to claim 7, wherein the foam boosting agent comprises a carbohydrate foam boosting agent.

9. The composition according to claim 8, wherein the foam boosting agent comprises encapsulated pressurized gas.

10. The composition according to claim 1, wherein the composition further comprises an edible acid and a bi-carbonate.

11. The composition according to claim 1, wherein the composition further comprises sucrose, lactose or a combination thereof.

12. The composition according to claim 1, wherein the composition further comprises a flavor.

13. The composition according to claim 12, wherein the flavor is cream, milk, caramel or coffee.

14. The composition according to claim 1, wherein the composition further comprises chocolate pieces.

15. A method for preparing a coffee composition, the method comprising combining 0.5 to 25 wt % coffee, 0.5 to 25 wt % foaming agent, 1 to 20 wt % protein source, and at least 2 wt. %, based on the total weight of the composition, of kappa-carrageenan, iota-carrageenan or combination thereof, wherein the coffee, the foaming agent, the protein source, and the kappa-carrageenan, iota-carrageenan, or combination thereof are combined in amounts effective to provide a bottom liquid layer, a top froth layer, and a middle gel layer upon dilution of the coffee composition in water.

16. A method for preparing a three-layered coffee drink, the method comprising mixing hot water with a composition comprising coffee, a foaming agent, a protein source; and at least 1.3 wt %, based on the total weight of the composition, of a kappa-carrageenan, iota-carrageenan or combination thereof.

17. The method according to claim 15, wherein the kappa-carrageenan, iota-carrageenan or combination thereof is present in an amount of from 4 to 10 wt % with respect to the total weight of the composition.

18. The method according to claim 17, wherein the kappa-carrageenan, iota-carrageenan or combination thereof is present in an amount of 5 to 7 wt % based on the total weight of the composition.

19. The method according to claim 16, wherein the kappa-carrageenan, iota-carrageenan or combination thereof is present in an amount of from 4 to 10 wt % with respect to the total weight of the composition.

* * * * *

UNITED STATES PATENT AND TRADEMARK OFFICE
CERTIFICATE OF CORRECTION

PATENT NO. : 8,529,973 B2
APPLICATION NO. : 12/679237
DATED : September 10, 2013
INVENTOR(S) : Ayse Tulay Massey and Adrian Harold Massey Page 1 of 1

It is certified that error appears in the above-identified patent and that said Letters Patent is hereby corrected as shown below:

IN THE CLAIMS:

Column 6, line 1, in claim 9, delete "Claim 8," and insert -- Claim 7, --.

Signed and Sealed this
Sixteenth Day of August, 2016

Michelle K. Lee
*Director of the United States Patent and Trademark Office*